US009180371B2

United States Patent
Tsuchiya

(10) Patent No.: US 9,180,371 B2
(45) Date of Patent: Nov. 10, 2015

(54) GAME DEVICE, GAME DEVICE CONTROL METHOD, PROGRAM, AND INFORMATION STORAGE MEDIUM

(75) Inventor: Shin Tsuchiya, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 14/125,930

(22) PCT Filed: Apr. 6, 2012

(86) PCT No.: PCT/JP2012/059597
§ 371 (c)(1),
(2), (4) Date: Dec. 12, 2013

(87) PCT Pub. No.: WO2012/172859
PCT Pub. Date: Dec. 20, 2012

(65) Prior Publication Data
US 2014/0120993 A1 May 1, 2014

(30) Foreign Application Priority Data
Jun. 14, 2011 (JP) ................................. 2011-132728

(51) Int. Cl.
*A63F 13/40* (2014.01)
*A63F 13/812* (2014.01)
*A63F 13/56* (2014.01)
*A63F 13/5372* (2014.01)

(52) U.S. Cl.
CPC .............. *A63F 13/10* (2013.01); *A63F 13/5372* (2014.09); *A63F 13/56* (2014.09); *A63F 13/812* (2014.09); *A63F 2300/6607* (2013.01); *A63F 2300/8011* (2013.01)

(58) Field of Classification Search
CPC ................. A63F 2300/6607; A63F 2300/8011; A63F 13/56; A63F 13/5372; A63F 13/812
USPC ............................................................ 463/4
See application file for complete search history.

(56) References Cited

U.S. PATENT DOCUMENTS

| 8,475,250 B2* | 7/2013 | Kondo et al. .................. 463/4 |
| 8,485,898 B2* | 7/2013 | Tomita et al. .................. 463/31 |
| 8,715,049 B2* | 5/2014 | Yanagihara et al. ............. 463/7 |
| 2007/0232375 A1* | 10/2007 | Izumi et al. ..................... 463/7 |
| 2012/0019472 A1* | 1/2012 | Tomita et al. ................. 345/173 |
| 2012/0309479 A1* | 12/2012 | Ojima .............................. 463/4 |

FOREIGN PATENT DOCUMENTS

| JP | 3533393 B1 | 5/2004 |
| JP | 2010-035828 A | 2/2010 |
| JP | 2010-057841 A | 3/2010 |

OTHER PUBLICATIONS

English translation of the Written Opinion of the International Searching Authority sent with the International Preliminary Report on Patentability and PCT/IB/338 dated Jan. 3, 2014.
International Search Report for PCT/JP2012/059597 dated Jun. 12, 2012.

* cited by examiner

*Primary Examiner* — Michael Cuff
(74) *Attorney, Agent, or Firm* — Hubbs, Enatsky & Inoue PLLC

(57) ABSTRACT

To provide a game device capable of assisting a user to make a pass to a teammate player character in a game performed between a user character group operated by the user and an opponent character group. A setting unit sets a plurality of positions in an area around a character holding the moving object as receiving position candidates for another character to receive a pass. A receiving position selecting unit selects at least one of the receiving position candidates, based on the position of a character belonging to the opponent character group. A character selecting unit selects a character corresponding to the receiving position candidate from among the player characters belonging to the user character group other than the character holding the moving object. A character control unit moves the character corresponding to the selected receiving position candidate toward a position based on the selected receiving position candidate.

10 Claims, 7 Drawing Sheets

| ID | BASE POSITION | CURRENT POSITION | OPERATION TARGET FLAG | BALL HOLDING FLAG | ... |
|---|---|---|---|---|---|
| P101 | — — — | — — — | 0 | 0 | ... |
| P102 | — — — | — — — | 0 | 0 | ... |
| ... | ... | ... | ... | ... | ... |
| P110 | — — — | — — — | 1 | 1 | ... |
| P111 | — — — | — — — | 0 | 0 | ... |
| P201 | — — — | — — — | 0 | 0 | ... |
| P202 | — — — | — — — | 0 | 0 | ... |
| ... | ... | ... | ... | ... | ... |
| P210 | — — — | — — — | 0 | 0 | ... |
| P211 | — — — | — — — | 0 | 0 | ... |

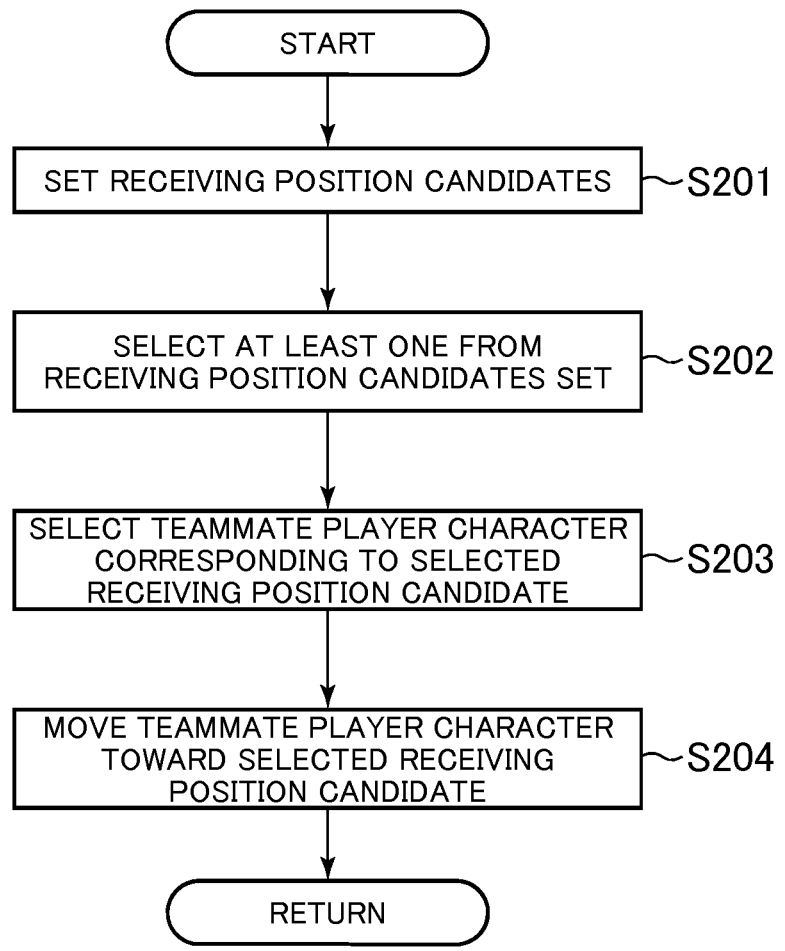

GAME DEVICE, GAME DEVICE CONTROL METHOD, PROGRAM, AND INFORMATION STORAGE MEDIUM

CROSS REFERENCE TO RELATED APPLICATIONS

This application is a National Stage of International Application No. PCT/JP2012/059597 filed Apr. 6, 2012, claiming priority based on Japanese Patent Application No. 2011-132728 filed on Jun. 14, 2011. The contents of each of the above documents are incorporated herein by reference in their entirety.

TECHNICAL FIELD

The present invention relates to a game device, a game device control method, a program, and an information storage medium.

BACKGROUND ART

There has been known a game in which a match using a moving object (for example, a ball, a puck, or the like) is performed between a user character group operated by a user and an opponent character group. For example, a soccer game has been known. For example, in a soccer game, a user aims to put a ball into the goal of the opponent team by operating a player character holding the ball among the player characters belonging to their team and making a pass to a teammate character.

CITATION LIST

Patent Literature

Patent Literature 1: JP 2010-035828 A

SUMMARY OF INVENTION

Technical Problem

For example, in the above described soccer game, it may be difficult for a user to make a pass to a teammate player character. In particular, it may be often a case that a not-well trained user cannot make a pass to a teammate player character as there is no unmarked teammate player character (that is, a teammate player character with no opponent player character positioned nearby) near the player character holding the ball.

The present invention has been conceived in view of the above, and aims to provide a game device, a game device control method, a program, and an information storage medium capable of assisting a user to make a pass to a teammate player character in a game in which a match using a moving object is performed between a user character group operated by the user and an opponent character group.

Solution to Problem

In order to achieve the above mentioned object, a game device according to the present invention is a game device in which a match using a moving object is performed between a user character group operated by a user and an opponent character group, the game device including means for obtaining position data stored in storage means for storing position data on a position of each of a plurality of characters belonging to the user character group and a position of each of a plurality of characters belonging to the opponent character group; setting means for setting, when any of the characters belonging to the user character group holds the moving object, a plurality of positions in an area around the character holding the moving object as receiving position candidates where another character belonging to the user character group receives a pass from the character holding the moving object; receiving position selecting means for selecting at least one of the receiving position candidates set by the setting means, based on a position of a character belonging to the opponent character group; and character selecting means for selecting a character corresponding to the receiving position candidate from among the characters belonging to the user character group other than the character holding the moving object, based on a position of the receiving position candidate and positions of the characters belonging to the user character group other than the character holding the moving object; and character control means for moving the character selected by the character selecting means as the character corresponding to the receiving position candidate selected by the receiving position selecting means toward a position based on the receiving position candidate selected by the receiving position selecting means.

A control method for a game device according to the present invention is a control method for controlling a game device in which a match using a moving object is performed between a user character group operated by a user and an opponent character group, the control method including a step of obtaining position data stored in storage means for storing position data on a position of each of a plurality of characters belonging to the user character group and a position of each of a plurality of characters belonging to the opponent character group; a setting step of setting, when any of the characters belonging to the user character group holds the moving object, a plurality of positions in an area around a position of the character holding the moving object as receiving position candidates where another character belonging to the user character group receives a pass from the character holding the moving object; a receiving position selecting step of selecting at least one of the receiving position candidates set at the setting step, based on a position of a character belonging to the opponent character group; and a character selecting step of selecting a character corresponding to the receiving position candidate from among the characters belonging to the user character group other than the character holding the moving object, based on a position of the receiving position candidate and positions of the characters belonging to the user character group other than the character holding the moving object; and a character control step of moving the character selected at the character selecting step as the character corresponding to the receiving position candidate selected at the receiving position selecting step toward a position based on the receiving position candidate selected at the receiving position selecting step.

A program according to the present invention is a program for causing a computer to function as a game device in which a match using a moving object is performed between a user character group operated by a user and an opponent character group, the program causing the computer to function as means for obtaining position data stored in a storage means for storing position data on a position of each of a plurality of characters belonging to the user character group and a position of each of a plurality of characters belonging to the opponent character group; setting means for setting, when any of the characters belonging to the user character group holds the moving object, a plurality of positions in an area around a position of the character holding the moving object as receiving position candidates where another character belonging to the user character group receives a pass from the character holding the moving object; receiving position selecting means for selecting at least one of the receiving position candidates set by the setting means, based on a position of a character belonging to the opponent character group; and character selecting means for selecting a character corresponding to the receiving position candidate from among the characters belonging to the user character group other than the character holding the moving object, based on a position of the receiving position candidate and positions of the characters belonging to the user character group other than the character holding the moving object; and character control means for moving the character selected by the character selecting means as the character corresponding to the receiving position candidate by the receiving position selecting means toward a position based on the receiving position candidate selected by the receiving position selecting means.

An information storage medium according to the present invention is a computer readable information storage medium storing the above described program.

According to the present invention, in a game in which a match using a moving object is performed between a user character group operated by a user and an opponent character group, it is possible to assist the user to make a pass to a teammate player character.

In one embodiment of the present invention, in a case where the character holding the moving object moves, the setting means may set, as the receiving position candidates, a plurality of positions in an area around the position of the character holding the moving object after the movement, to thereby cause the receiving position candidates to move according to the movement of the character holding the moving object.

In one embodiment of the present invention, the setting means may set as the receiving position candidates the plurality of positions in the area around the character holding the moving object, the plurality of positions having a predetermined relative positional relationship with the position of the character holding the moving object.

In one embodiment of the present invention, the plurality of positions in the area around the character holding the moving object may be set so as to surround the position of the character holding the moving object, and the setting means may set the plurality of positions surrounding the position of the character holding the moving object as the receiving position candidates.

In one embodiment of the present invention, the plurality of positions in the area around the character holding the moving object may include positions set on respective straight lines extending from the position of the character holding the moving object in a plurality of respective predetermined directions, and the setting means may set the positions set on the respective straight lines extending from the position of the character holding the moving object in the plurality of respective predetermined directions as the receiving position candidates.

In one embodiment of the present invention, the plurality of predetermined directions may include a first direction, a second direction opposite to the first direction, a third direction orthogonal to the first direction, a fourth direction opposite to the third direction, a fifth direction between the first direction and the third direction, a sixth direction between the second direction and the third direction, a seventh direction between the first direction and the fourth direction, and an eighth direction between the second direction and the fourth direction.

In one embodiment of the present invention, the game device may further include means for presenting to the user a character moving toward the position based on the receiving position candidate selected by the receiving position selecting means in a game screen.

BRIEF DESCRIPTION OF DRAWINGS

FIG. 11 is a flowchart showing one example of processing executed in the game device.

DESCRIPTION OF EMBODIMENTS

In the following, an example of an embodiment of the present invention will be described in detail with reference to the accompanying drawings. A game device according to an embodiment of the present invention is implemented using, for example, a consumer game device (an installation type game device), a portable game device, a portable phone, a personal digital assistant (PDA), a personal computer, or the like. In the following, a case in which a consumer game device is used to implement a game device according to an embodiment of the present invention will be described.

Figure 1:
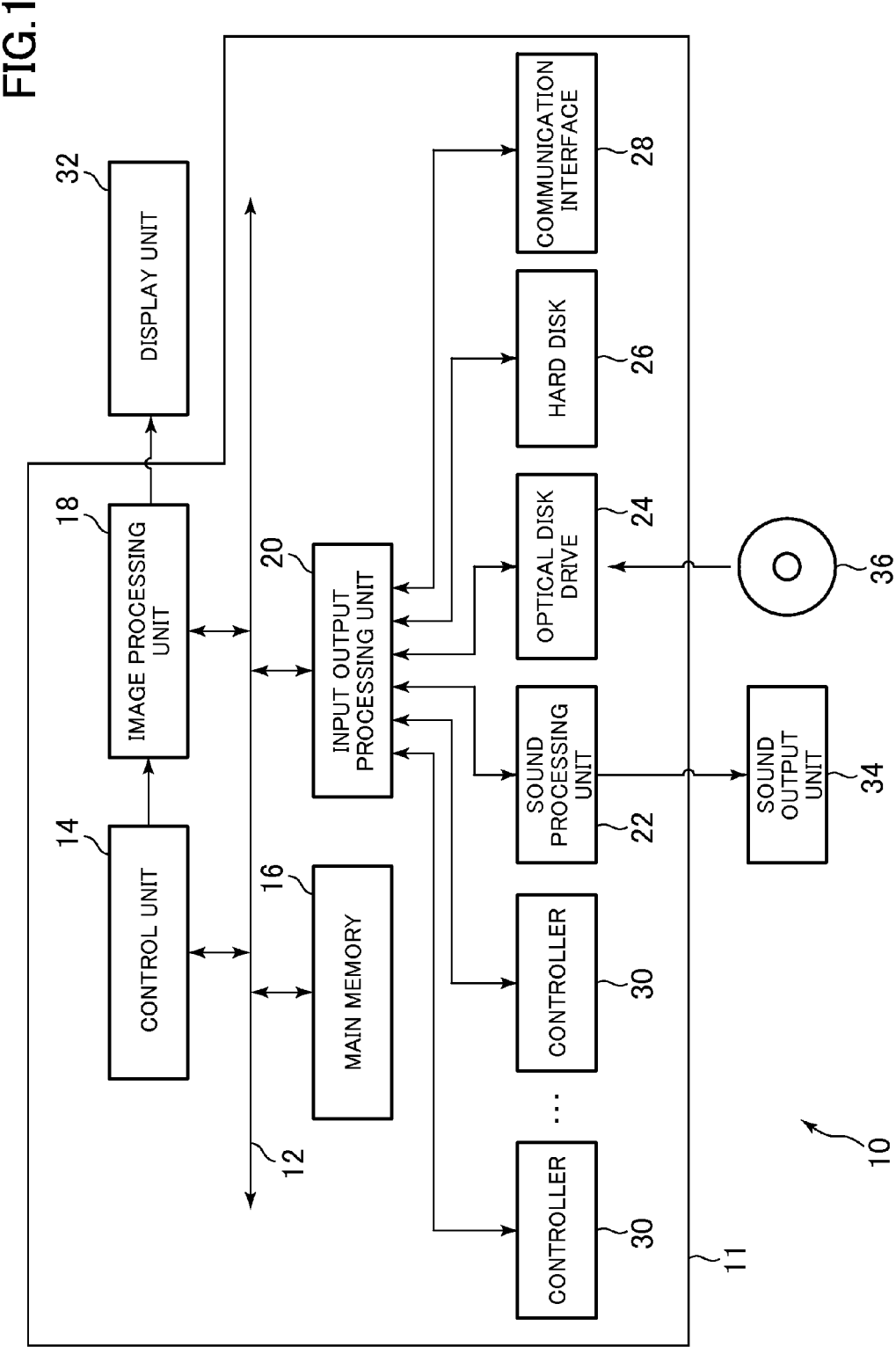
FIG. 1 shows a hardware structure of a game device according to an embodiment of the present invention.

FIG. 1 shows a hardware structure of a game device according to an embodiment of the present invention. The game device 10 shown in FIG. 1 includes a consumer game device 11, a display unit 32, a sound output unit 34, and an optical disk 36 (an information storage medium). The display unit 32 and the sound output unit 34 are connected to the consumer game device 11. For example, a home-use television set receiver, a liquid crystal display, or the like is used as the display unit 32, and for example, a speaker, a headphone, or the like incorporated in a home-use television set receiver is used as the sound output unit 34.

The consumer game device 11 is a publicly known computer system. The consumer game device 11 includes a bus 12, a control unit 14, a main memory 16, an image processing unit 18, an input output processing unit 20, a sound processing unit 22, an optical disk drive 24, a hard disk 26, a communication interface 28, and a controller 30.

The control unit 14 includes one or more microprocessors. The control unit 14 executes control processing of the respective units and information processing, based on the program read from the optical disk 36. The main memory 16 includes, for example, a RAM, and a program and data read from the optical disk 36 are written into the main memory 16. The main memory 16 is used also as a working memory of the control unit 14. The bus 12 is used to exchange an address and data between the respective units of the consumer game device 11.

The image processing unit 18 includes a VRAM, and renders a screen image into the VRAM, based on the image data supplied from the control unit 14. The screen image rendered in the VRAM is converted into a video signal and then output to the display unit 32.

The input output processing unit 20 is an interface via which the control unit 14 accesses the sound processing unit 22, the optical disk drive 24, the hard disk 26, the communication interface 28, and the controller 30. The sound processing unit 22 includes a sound buffer, and outputs the sound data read from the optical disk 36 into the sound buffer via the sound output unit 34. The communication interface 28 is an interface for connecting the consumer game machine 11 in a wired or wireless manner to a communication network, such as the Internet or the like.

The optical disk drive 24 reads a program and data recorded on the optical disk 36. Although the optical disk 36 is used here to supply a program and data to the consumer game machine 11, other information storage media, such as a memory card or the like, may be used instead. Alternatively, a program and data may be supplied to the consumer game machine 11 from a remote place via, for example, a communication network. The hard disk 26 is a typical hard disk device (an auxiliary memory device). The program and data, described here as being recorded on the optical disk 36, may be stored on the hard disk 26 instead. A solid state drive may be equipped in the game machine 10, instead of the hard disk 26.

The controller 30 is an operating unit for a user to operate. Two or more controllers 30 can be connected in a wired or wireless manner to the consumer game machine 11. The input output processing unit 20 scans the state of operation of each operating member of the controller 30 every constant period (for example, for every $1/60^{th}$ of a second), and supplies an operation signal indicative of the result of scanning to the control unit 14 via the bus 12. The control unit 14 determines a game operation by a user, based on the operation signal.

In the game device 10, various games are executed. For example, a game in which a match using a moving object (for example, a ball, a puck, or the like) is played between a user character group operated by a user and an opponent character group is executed.

In the following, an example of a case in which a soccer game is played will be described. In the soccer game, a soccer match is played between a user team (a user character group) and an opponent team (an opponent character group). Note that the opponent team may be operated by a computer or another user. In the following, a case in which the opponent team is operated by a computer will be described.

Figure 2:
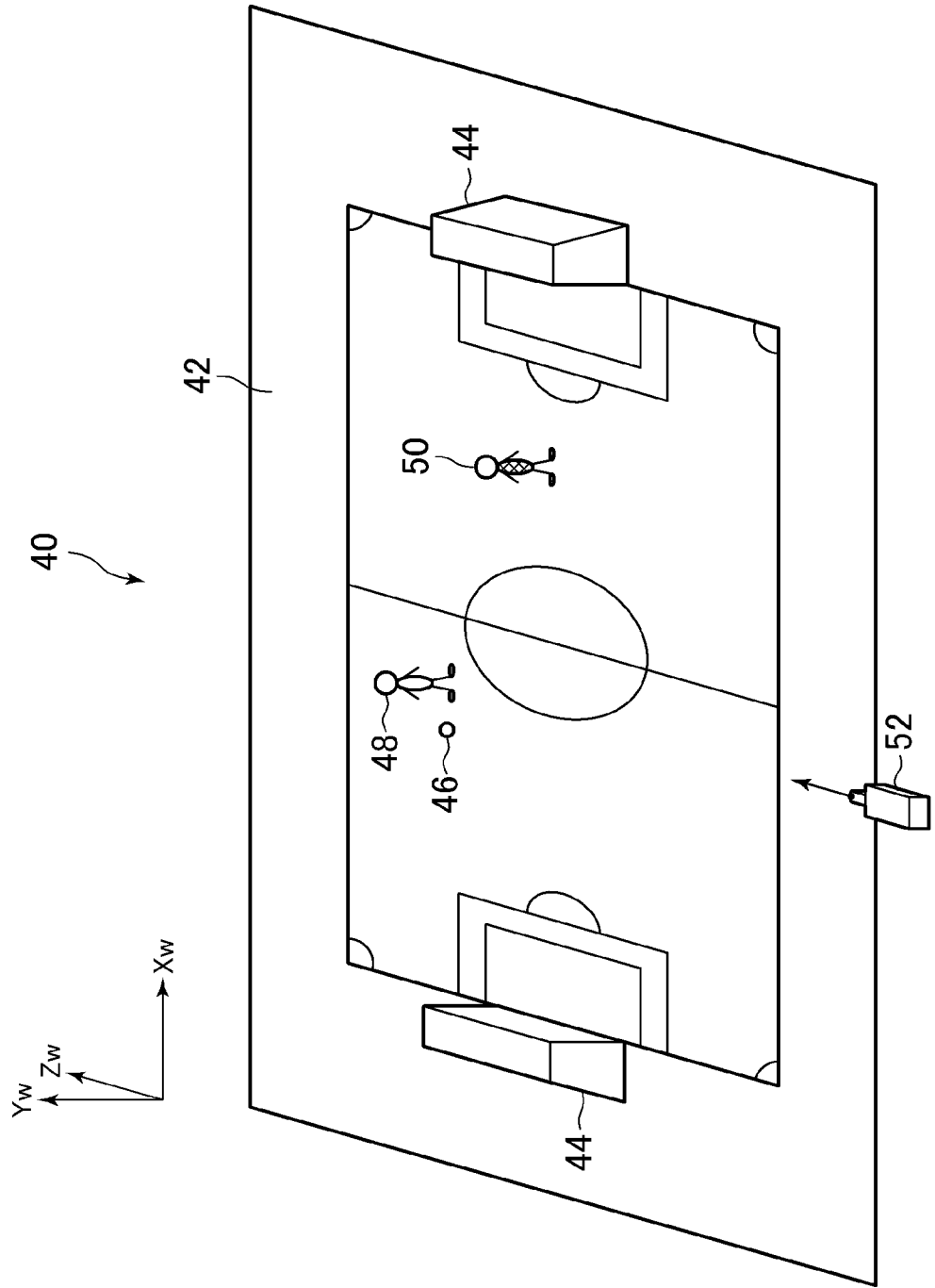
FIG. 2 shows one example of a game space.

In executing a soccer game, a game space is generated in the main memory 16. FIG. 2 shows one example of the game space. The game space 40 shown in FIG. 2 is a virtual 3D space defined by three mutually orthogonal coordinate axes (Xw axis, Yw axis, and Zw axis). The position or the like of an object placed in the game space 40 is identified based on these three coordinate axes.

As shown in FIG. 2, a field 42, or an object representative of a soccer field, is placed in the game space 40. Further, a goal 44, or an object representative of a soccer goal, a ball 46, or an object representative of a soccer ball, a player character 48, or an object representative of a soccer player belonging to the user team, and a player character 50, or an object representative of a soccer player belonging to the opponent team, are placed on the field 42. Although not shown in FIG. 2, eleven player characters 48 belonging to the user team and eleven player characters 50 belonging to the opponent team are placed on the field 42.

One of the goals 44 is associated with the user team, while the other to the opponent team. When the ball 46 moves into the goal 44 associated either one of the teams, a score event occurs to the other team.

When the player character 48 (50) and the ball 46 get closer to each other, the player character 48 (50) and the ball 56 are associated with each other under a predetermined condition. In this case, a movement action of the player character 48 (50) is a dribble action. In the following, a state in which the ball 46 is associated with the player character 48 (50) will be described as "the player character 48 (50) holding the ball 46".

A virtual camera 52 (viewpoint) is set in the game space 40. A game screen showing the game space 40 viewed from the virtual camera 52 is shown on the display unit 32. For example, the virtual camera 52 moves, based on the position of the ball 46, such that the ball 46 is always shown in the game screen.

Figure 3:
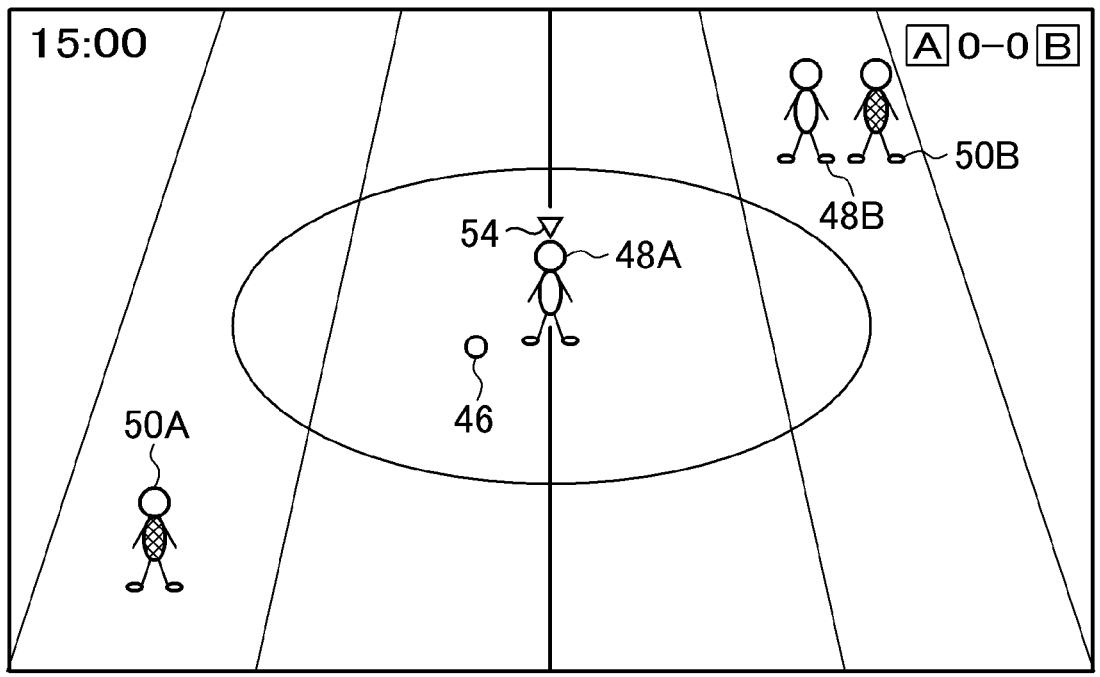
FIG. 3 shows one example of a game screen.

FIG. 3 shows one example of the game screen. Four player characters 48A, 48B, 50A, 50B are displayed in the game screen image shown in FIG. 3. Of these four, two player characters 48A, 48B are player characters 48 belonging to the user team, while the remaining two player characters 50A, 50B are player characters 50 belonging to the opponent team.

In the soccer game, any of the player characters 48 belonging to the user team is set as an operation target for a user (a user's operation target). In the game screen shown in FIG. 3, a cursor 54 is displayed above the head of the player character 48A. The cursor 54 serves as an identifier of a player character 48 that is a user's operation target. The player character 48A that is a user's operation target acts according to a user operation. For example, the player character 48A that is a user's operation target moves in a direction designated by a direction designating operation by the user.

A user's operation target is switchable among the player characters 48 belonging to the user team. For example, when the user team is attacking (that is, when any player character 48 belonging to the user team is holding the ball 46), the player character 48 holding the ball 46 is set as the user's operation target. In this case, when a different player character 48 obtains and holds the ball 46, the user's operation target is switched. Meanwhile, for example, when the user team is not attacking (that is, any player character 50 belonging to the opponent team is holding the ball 46 or neither of player characters 48, 50 is holding the ball 46), a player character 48 positioned nearest to the ball 46 is set as the user's operation target. In this case, for example, when the position of the ball 46 is changed significantly such that the distance to the ball 46 becomes longer, the user's operation target is switched. Note that a user's operation target may be switched according to the user's switching instruction operation (for example, an operation of pressing a predetermined button of the controller 30).

The player characters 48 that are not a user's operation target among the player characters 48 belonging to the user team act according to an operation of the computer. The player characters 50 belonging to the opponent team also act according to an operation of the computer.

In the following, a technique for assisting a user to make a pass to a teammate player character in the above-described soccer game will be described.

Figure 4:
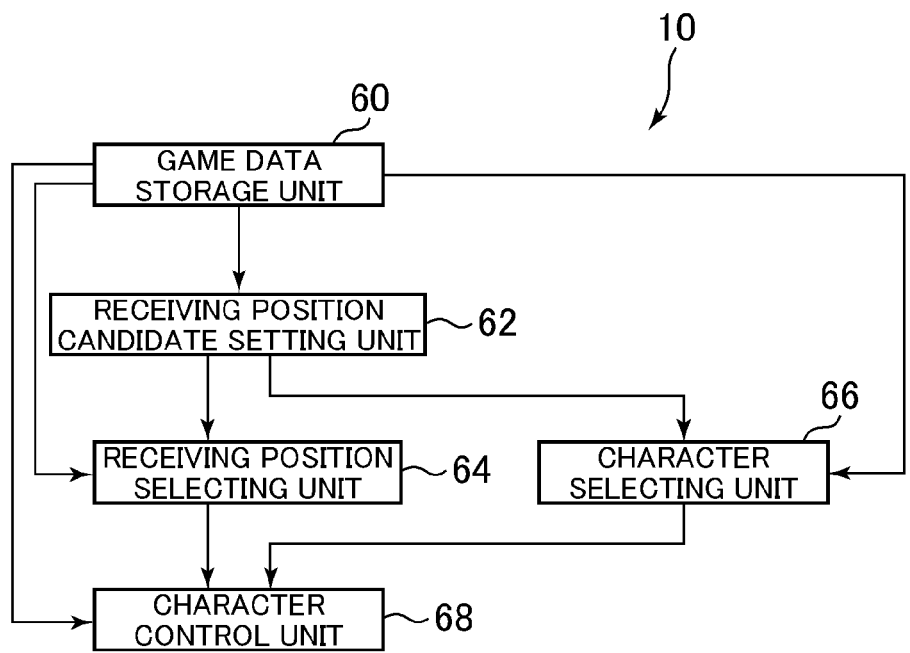
FIG. 4 is a functional block diagram of the game device according to the embodiment of the present invention.

FIG. 4 is a functional block diagram showing a functional block related to the present invention among those realized in the game device 10. As shown in FIG. 4, the game device 10 includes a game data storage unit 60, a receiving position candidate setting unit 62, a receiving position selecting unit 64, a character selecting unit 66, and a character control unit 68. The game data storage unit 60 is implemented using, for example, the main memory 16 and the optical disk 36, while the other functional blocks are implemented by the control unit 14 by executing the program read from the optical disk 36.

Initially, the game data storage unit 60 will be described. The game data storage unit 60 stores data necessary to execute a game.

For example, model data on each object placed in the game space 40, motion data on each of player characters 48, 50, and action control data (for example, artificial intelligence (AI)) for controlling an action of each of player characters 48, 50 are stored in the game data storage unit 60.

Further, for example, ability parameter data regarding the ability of each of player characters 48, 50 is stored in the game data storage unit 60. For example, in a soccer game, an ability parameter includes, for example, a running parameter, an endurance parameter, a pass ability parameter, a shoot ability parameter, a free kick ability parameter, and so forth. The ability parameter is a parameter indicating the level of ability with, for example, a numeric value, such as, "0" to "100".

Further, for example, game situation data describing the current situation of a game is stored in the game data storage unit 60. For example, in a soccer game, game situation data describing the current situation of the soccer game is stored in the game data storage unit 60. Specifically, the game situation data includes, for example, data described below:

state data on each of player characters 48, 50 (position, movement direction, moving speed, and so forth);

state data on the ball 46 (position, movement direction, moving speed, and so forth);

state data on the virtual camera 52 (position, viewing direction, viewing angle, and so forth);

score data indicating the scores of both teams; and elapsed period data indicating a period of time elapsed after the start of the match.

Figures 5, 6:
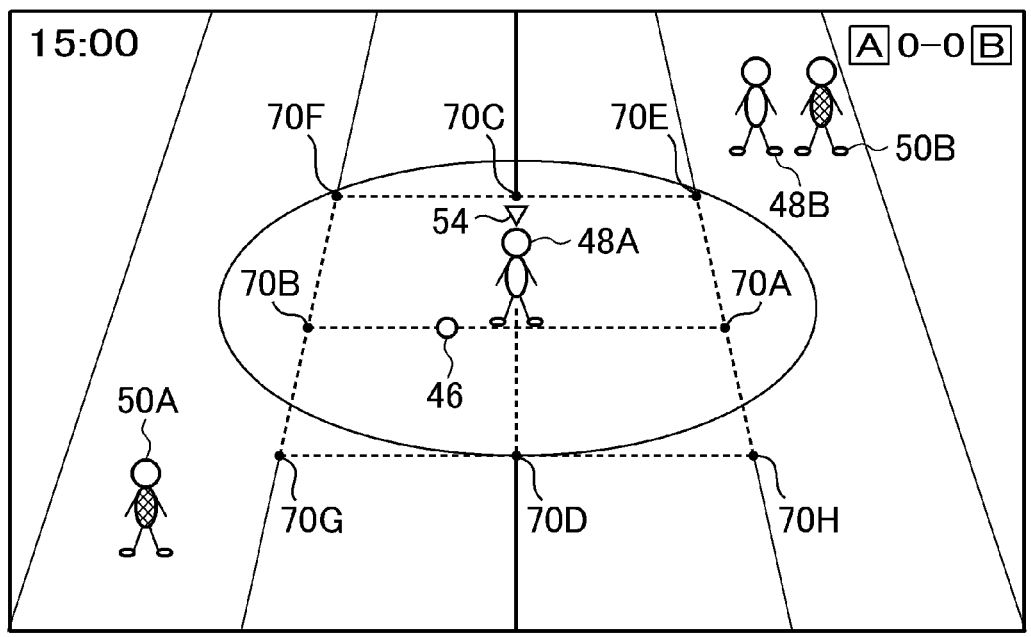
FIG. 5 shows one example of player character state data.
FIG. 6 shows one example of a receiving position candidate.

FIG. 5 shows one example of the player character state data describing the current state of each of player characters 48, 50. The player character state data shown in FIG. 5 includes "ID", "base position", "current position", "operation target flag", and "ball holding flag" fields, and so forth.

The "ID" field indicates information uniquely identifying each of the player characters 48, 50. In FIG. 5, "P101" to "P111" are the IDs of the player characters 48 belonging to the user team, while "P201" to "P211" are the IDs of the player characters 50 belonging to the opponent team.

The "base position" field indicates the base position of each of the player characters 48, 50. The "base position" refers to, for example, the position in which each of the player characters 48, 50 is present at the time of kicking off. For example, the base position of each of player characters 48 belonging to the user team is set in accordance with the formation employed by the user team and a role (position type, including, for example, a forward, a midfielder, a defender, or a goal keeper) assigned to the player character 48.

The "current position" field indicates the current position in which each of the player characters 48, 50 is present. The "operation target flag" field indicates whether or not the player character 48 is a user's operation target, and takes a value of either "0" or "1". The value "0" means that the player character 48 is not a user's current operation target, while the value "1" means that the player character 48 is a user's current operation target. The "ball holding flag" field indicates whether or not the player character 48 holds the ball 46, or whether or not the player character 50 holds the ball 46. The "ball holding flag" field takes a value of either "0" or "1". The value "0" means that the player character 48 is not holding the ball 46, or that the player character 50 is not holding the ball 46, while the value "1" means that the player character 48 is holding the ball 46, or that the player character 50 is holding the ball 46. Note that although not shown in FIG. 5, the player character state data includes a field other than the above mentioned fields, such as, for example, a "movement direction" field indicating a movement direction of each of the player characters 48, 50.

Below, the receiving position candidate setting unit 62 will be described. When any player character 48 belonging to the user team (the user character group) is holding the ball 46 (the moving object), the receiving position candidate setting unit 62 sets two or more positions in an area around the position of the player character 48 holding the ball 46 as receiving position candidates where another player character 48 (a teammate player character) receives a pass from the player character 48 holding the ball 46.

Figure 7:
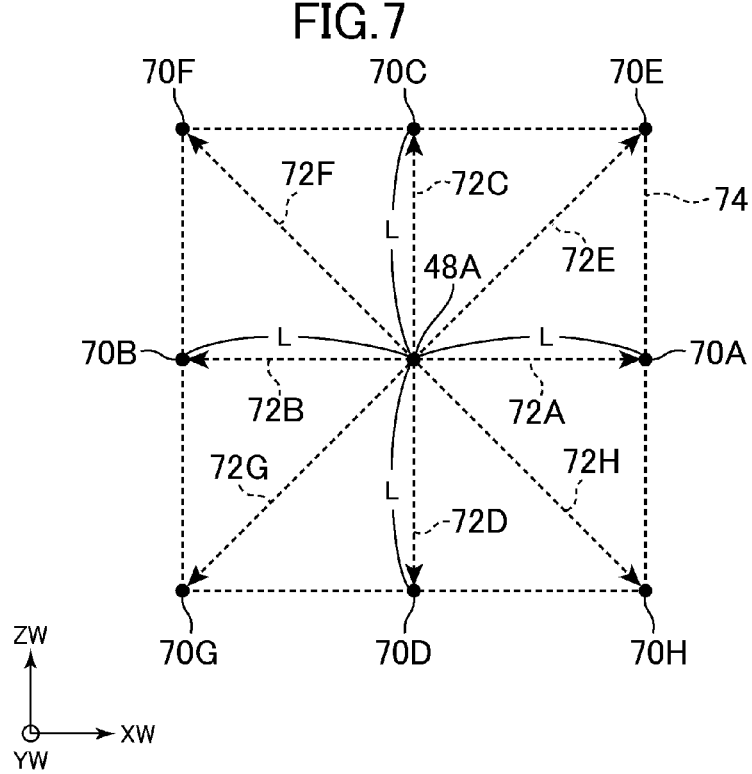
FIG. 7 is diagram explaining the receiving position candidate in detail.

FIG. 6 shows one example of the receiving position candidate set by the receiving position candidate setting unit 62. In FIG. 6, the reference numerals 70A, 70B, 70C, 70D, 70E, 70F, 70G, 70H indicate respective receiving position candidates set by the receiving position candidate setting unit 62. That is, in the example shown in FIG. 6, eight receiving position candidates 70A to 70H are set. FIG. 7 explains these eight receiving position candidates 70A to 70H in detail. FIG. 7 shows a picture showing a positional relationship between the player character 48A holding the ball 46 and the respective receiving position candidates 70A to 70H viewed from directly above. In the following, an operation of the receiving position candidate setting unit 62 will be described with reference to FIGS. 6 and 7. Note that the receiving position candidates 70A to 70H may be hereinafter collectively referred to as a "receiving position candidate 70".

The receiving position candidate setting unit 62 sets "two or more positions having a predetermined relative positional relationship with respect to the position of the player character 48 holding the ball 46", the two or more positions being in an area around the position of the player character 48 holding the ball 46, as the receiving position candidates 70.

In the example shown in FIG. 7 (and FIG. 6), the receiving position candidates 70A to 70H are set on a vertex or a side of a square 74 with the position of the player character 48A as the middle. That is, the receiving position candidates 70E to 70H are set on the respective vertexes of the square 74, while the receiving position candidates 70A to 70D are set on the respective middles of the respective sides of the square 74.

Note that the positional relationship (the above described "predetermined relative positional relationship") between the player character 48A holding the ball 46 and the receiving position candidate 70 is not limited to the example shown in FIGS. 6 and 7. For example, the receiving position candidate 70 may be set on a vertex or a side of a quadrilateral (a quadrilateral other than a square: for example, a rectangular or a rhombus) with the position of the player character 48A as the middle or a triangle with the position of the player character 48A as the barycenter. Alternatively, the receiving position candidate 70 may be set on a circle or an oval with the position of the player character 48A as the center.

The receiving position candidate setting unit 62 sets two or more positions surrounding the position of the player character 48 holding the ball 46 as the receiving position candidates 70. That is, the receiving position candidate setting unit 62 sets two or more positions as the receiving position candidates 70 such that the position of the player character 48 holding the ball 46 is included in the area defined by the straight lines connecting these positions.

As described above, in the example shown in FIG. 7, the receiving position candidates 70A to 70H are set on the respective vertexes and sides of the square 74 with the position of the player character 48A as the middle so as to surround the position of the player character 48A.

Note that the receiving position candidate setting unit 62 may set positions on the respective straight lines extending from the position of the player character 48 holding the ball 46 in a plurality of respective predetermined directions as the receiving position candidates 70. Note here that "a plurality of predetermined directions" refer to, for example, a plurality of directions having a predetermined relative relationship with respect to a representative direction (for example, the Xw axial positive direction) in the game space 40. Note that "a plurality of predetermined directions" may be, for example, a plurality of directions having a predetermined relative relationship with respect to a representative direction (for example, the advancing direction or the frontward direction) of the player character 48 holding the ball. In the example shown in FIG. 7, "a plurality of predetermined directions" is a plurality of directions having a predetermined relative relationship with respect to a representative direction (Xw axial positive direction) in the game space 40, as will be described below.

In the example shown in FIG. 7, the receiving position candidate 70A is set on the straight line extending from the position of the player character 48A in the direction 72A (the first direction). In the example shown in FIG. 7, the direction 72A is defined in the Xw axial positive direction. The receiving position candidate 70A is set at a position away from the position of the player character 48A in the direction 72A by a reference direction L.

The receiving position candidate 70B is set on the straight line extending from the position of the player character 48A in the direction 72B (the second direction). The direction 72B is opposite to the direction 72A, and in the example shown in FIG. 7, the direction 72B is defined in the Xw axial negative direction. The receiving position candidate 70B is set at a position away from the position of the player character 48A in the direction 72B by the reference distance L.

The receiving position candidate 70C is set on the straight line extending from the position of the player character 48A in the direction 72C (the third direction). The direction 72C is a direction orthogonal to the direction 72A, and in the example shown in FIG. 7, the direction 72C is defined in the Zw axial positive direction. The receiving position candidate 70C is set at a position away from the position of the player character 48A in the direction 72C by the reference distance L.

The receiving position candidate 70D is set on the straight line extending from the position of the player character 48A in the direction 72D (the fourth direction). The direction 72D is opposite to the direction 72C, and in the example shown in FIG. 7, the direction 72D is defined in the Zw axial negative direction. The receiving position candidate 70D is set at a position away from the position of the player character 48A in the direction 72D by the reference direction L.

The receiving position candidate 70E is set on the straight line extending from the position of the player character 48A in the direction 72E (the fifth direction). The direction 72E is the direction between the directions 72A and 72C, and in the example shown in FIG. 7, the direction 72E is set to a direction with the angle between the directions 72A and 72E being equal to the angle between the directions 72C and 72E. The receiving position candidate 70E is set at a position away from the position of the player character 48A in the direction 72E by a predetermined distance $(L^2+L^2)^{1/2}$.

Similarly, the receiving position candidate 70F is set on the straight line extending from the position of the player character 48A in the direction 72F (the sixth direction). The direction 72F is a direction between the directions 72B and 72C, and in the example shown in FIG. 7, the direction 72F is set to a direction with the angle between the directions 72B and 72F being equal to the angle between the directions 72C and 72F. The receiving position candidate 70F is set at a position away from the position of the player character 48A in the direction 72F by the predetermined distance $(L^2+L^2)^{1/2}$.

Similarly, the receiving position candidate 70G is set on the straight line extending from the position of the player character 48A in the direction 72G (the seventh direction). The direction 72G is a direction between the directions 72B and 72D, and in the example shown in FIG. 7, the direction 72G is set to a direction with the angle between the directions 72B and 72G being equal to the angle between the directions 72D and 72G. The receiving position candidate 70G is set at a position away from the position of the player character 48A in the direction 72G by the predetermined distance $(L^2+L^2)^{1/2}$.

Similarly, the receiving position candidate 70H is set on the straight line extending from the position of the player character 48A in the direction 72H (the eighth direction). The direction 72H is a direction between the directions 72A and 72D, and in the example shown in FIG. 7, the direction 72H is set to a direction with the angle between the directions 72A and 72H being equal to the angle between the directions 72D and 72H. The receiving position candidate 70H is set at a position away from the position of the player character 48A in the direction 72H by the predetermined distance $(L^2+L^2)^{1/2}$.

Figure 8:
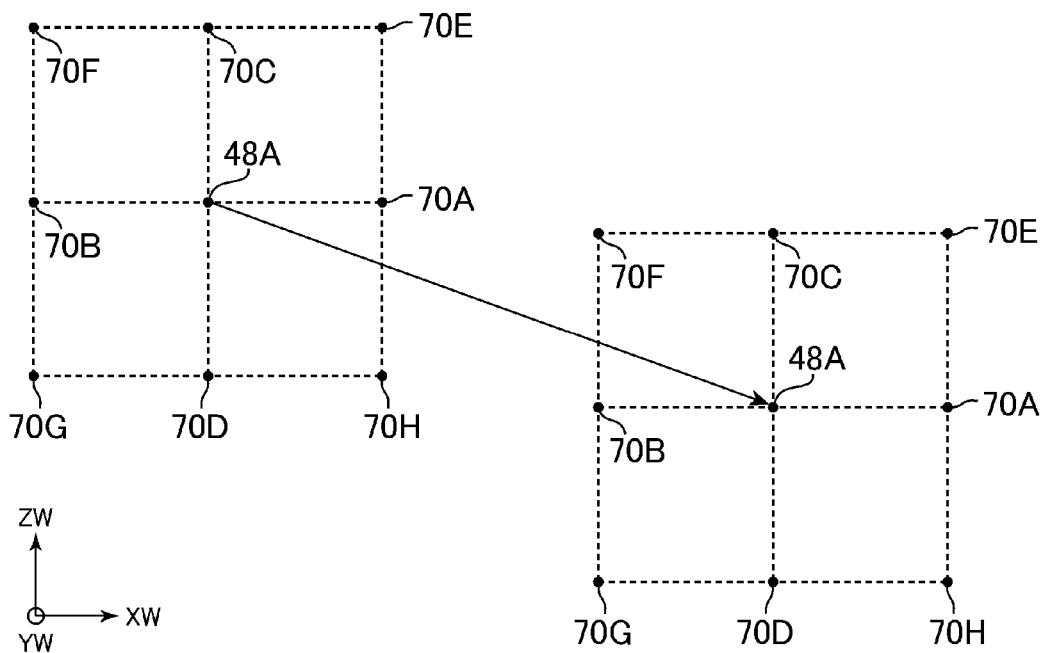
FIG. 8 is a diagram explaining change of the receiving position candidate upon movement of a player character holding the ball.

When the player character 48 holding the ball 46 moves, the receiving position candidate setting unit 62 sets two or more positions in an area around the position of the player character 48 after the movement as the receiving position candidates 70, to thereby cause the receiving position candidates 70 to move according to the movement of the player character 48 holding the ball 46. That is, as shown in FIG. 8, for example, when the player character 48A holding the ball 46 moves, the receiving position candidate setting unit 62 moves the receiving position candidates 70A to 70G in accordance with the movement of the player character 48A, while keeping the relative positional relationship between the player character 48A and the receiving position candidates 70A to 70G.

Below, the receiving position selecting unit 64 will be described. The receiving position selecting unit 64 selects at least one of the receiving position candidates 70 set by the receiving position candidate setting unit 62, based on the position of a player character 50 belonging to the opponent team (the opponent character group).

For example, the receiving position selecting unit 64 selects at least one of the receiving position candidates 70 set by the receiving position candidate setting unit 62, based on the position of a player character 50 belonging to the opponent team and the positions of player characters 48 among the player character 48 belonging to the user team other than the player character 48 holding the ball 46.

For example, the receiving position selecting unit 64 selects at least one of the receiving position candidates 70 set by the receiving position candidate setting unit 62, based on a result of determination as to whether or not each of the receiving position candidates 70 is present in an open space (a free space). For example, the receiving position selecting unit 64 selects a receiving position candidate 70 present in a so-called open space from among those set by the receiving position candidate setting unit 62. For example, for each of the receiving position candidates 70 set by the receiving position candidate setting unit 62, the receiving position selecting unit 64 determines whether or not a player character 50 belonging to the opponent team is present in an area within a predetermined distance from the receiving position candidate 70. When no player character 50 belonging to the opponent team is present within the above described area, the receiving position selecting unit 64 determines that the receiving position candidate 70 is in an open space.

Alternatively, the receiving position selecting unit 64 may determine whether or not the receiving position candidate 70 is in an open space in the manner described below. That is, the receiving position selecting unit 64 determines whether or not a period of time necessary for a player character 50 belonging to the opponent team to reach the receiving position candidate 70 is equal to or longer than a reference period of time. In this case, initially, the distance from the current position of the player character 50 to the receiving position candidate 70 is calculated. Then, the running parameter of the player character 50 is read from the optical disk 36. Further, the above-described distance is divided by the speed indicated by the read running parameter to thereby calculate a period of time necessary for the player character 50 to reach the receiving position candidate 70. Then, when the period of time necessary for the player 50 to reach the receiving position candidate 70 is equal to or longer than the reference period of time, the receiving position selecting unit 64 determines that the receiving position candidate 70 is in an open space.

Alternatively, the receiving position selecting unit 64 may determine whether or not the receiving position candidate 70 is in an open space in the following manner. That is, the receiving position selecting unit 64 determines whether or not the receiving position candidate 70 satisfies both of the two conditions mentioned below:

(1) the first reaching period and the second reaching period are each equal to or longer than a predetermined reference period of time; and (2) the first reaching period is shorter than the second reaching period.

Note that the "first reaching period" refers to a period of time necessary for a player character 48 belonging to the user team other than the player character 48 holding the ball 46 to reach the receiving position candidate 70. The first reaching period is calculated as described below. Initially, the distance from the current position of the player character 48 to the receiving position candidate 70 is calculated. Further, a running parameter of the player character 48 is read from the optical disk 36. Then, the above-described distance is divided by the speed indicated by the read running parameter to thereby calculate the first reaching period.

The "second reaching period" refers to a period of time necessary for a player character 50 belonging to the opponent team to reach the receiving position candidate 70. The second reaching period is calculated in a manner similar to that for the first reaching period.

The above-described condition (1) corresponds to a condition for determining whether neither of player characters 48, 50 is positioned around the receiving position candidate 70. The above-described condition (2) corresponds to a condition for determining whether or not a player character 48 belonging to the user team (a player character 48 other than the player character 48 holding the ball 46) is able to reach the receiving position candidate 70 earlier than a player character 50 belonging to the opponent team. When the receiving position candidate 70 satisfies both of these two above-described conditions (1) and (2), the receiving position candidate setting unit 62 determines that the receiving position candidate 70 is in an open space.

In this embodiment, the receiving position candidates 70 are divided into a plurality of groups. For example, the receiving position candidates 70A to 70H are divided into three groups including one including the receiving position candidates 70A, 70E, 70H, one including the receiving position candidates 70C, 70D, and one including the receiving position candidates 70B, 70F, 70G. Grouping, however, is not limited to this example. For example, the receiving position candidates 70A to 70H may be divided into three groups including one including the receiving position candidates 70A, 70B, one including the receiving position candidates 70C, 70E, 70F, and one including the receiving position candidates 70D, 70G, 70H.

The receiving position selecting unit 64 selects one receiving position candidate 70 with respect to each group. For example, when there is only one receiving position candidate 70 present in an open space among the receiving position candidates 70 belonging to the group, the receiving position selecting unit 64 selects that receiving position candidate 70.

Further, for example, when there are two or more receiving position candidates 70 present in an open space among the receiving position candidates 70 belonging to a group, the receiving position selecting unit 64 selects any of those receiving position candidates 70. For example, any of those receiving position candidates 70 is selected at random. Further, for example, a receiving position candidate 70 having the longest distance to a player character 50 belonging to the opponent team among those receiving position candidates 70 may be selected. Alternatively, a receiving position candidate 70 which imposes on a player character 50 belonging to the opponent team the longest period of time to reach among those receiving position candidates 70 is selected.

Note that, for example, when there is no receiving position candidate 70 present in an open space among receiving position candidates 70 belonging to a group, the receiving position selecting unit 64 selects no receiving position candidate 70 from this group.

The character selecting unit 66 will be described below. The character selecting unit 66 selects a teammate player character corresponding to the receiving position candidate 70 from among the player characters 48 belonging to the user team (the user character group) other than the player character 48 holding the ball 46 (the moving object), based on the position of the receiving position candidate 70 and the positions of these player characters 48 (that is, player characters 48 belonging to the user team other than the player character 48 holding the ball).

As will be described later, the player character 48 selected as "a teammate player character corresponding to the receiving position candidate 70" is controlled so as to move to a position based on the receiving position candidate 70 (refer to the description below on the character control unit 68). Thus, a "teammate player character corresponding to the receiving position candidate 70" refers to a player character 48 caused to move to a position based on the receiving position candidate 70.

The character selecting unit 66 selects, as a teammate player character corresponding to the receiving position candidate 70, a player character 48 that is appropriate to be moved to a position based on the receiving position candidate 70 from among the player characters 48 belonging to the user team other than the player character 48 holding the ball 46. For example, the character selecting unit 66 selects, as a character corresponding to the receiving position candidate 70, a player character 48 positioned closest to the receiving position candidate 70 from among the player characters 48 belonging to the user team other than the player character 48 holding the ball 46. In the situation shown in FIG. 6, for example, the character selecting unit 66 selects the player character 48B as a teammate player character corresponding to the receiving position candidate 70E.

The character control unit 68 will be described. The character control unit 68 moves the player character 48 selected by the character selecting unit 66 as a teammate player character corresponding to the receiving position candidate 70 selected by the receiving position selecting unit 64 toward a position based on the receiving position candidate 70 selected by the receiving position selecting unit 64. "A position based on the receiving position candidate 70" may be, for example, the position itself of the receiving position candidate 70 or a position obtained by modifying the position of the receiving position candidate 70. "Modification of the position of the receiving position candidate 70" includes, for example, displacement of the receiving position candidate 70 in the direction opposite to the direction of a player character 50 belonging to the opponent team, to thereby ensure a longer distance from the player character 50 belonging to the opponent team.

Figure 9:
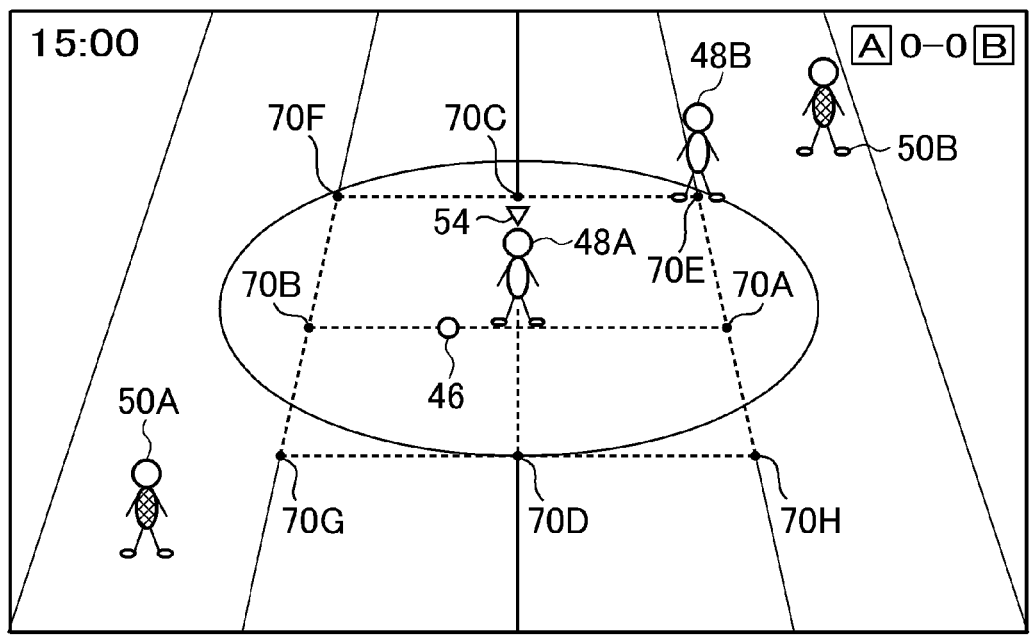
FIG. 9 shows one example of a game screen.

When the above described receiving position candidate setting unit 62, receiving position selecting unit 64, character selecting unit 66, and character control unit 68 are implemented, the player character 48B is caused to move to the receiving position candidate 70E in a situation, for example, such as is shown in FIG. 6. FIG. 9 shows one example of a game screen image displayed in this case. In this case, the player character 48B approaches an open space near the player character 48A. As a result, a user can readily make a pass to the player character 48B.

Figure 10:
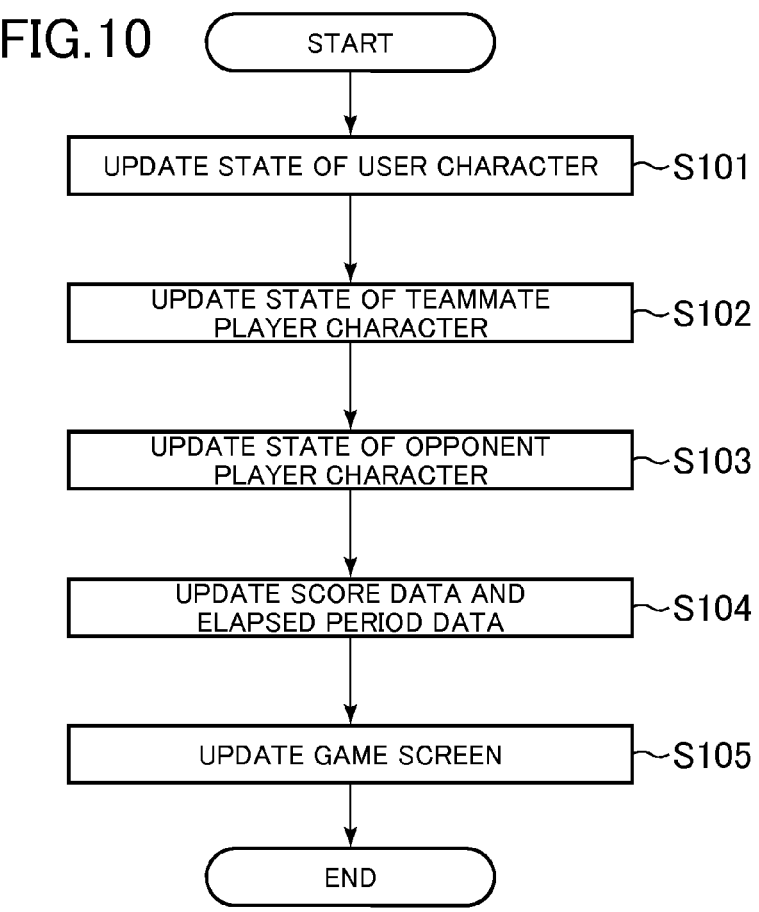
FIG. 10 is a flowchart showing one example of processing executed in the game device.

In the following, processing executed in the game device 10 will be described. FIG. 10 is a flowchart showing one example of processing that is executed in the game device 10 for a predetermined period of time (for example, $\frac{1}{60}^{th}$ of a second). The control unit 14 executes the processing shown in FIG. 10 according to the program read from the optical disk 36, to thereby function as the receiving position candidate setting unit 62, the receiving position selecting unit 64, the character selecting unit 66, and the character control unit 68.

As shown in FIG. 10, the control unit 14 updates the state (for example, the position, the movement direction, and so forth) of a user character, based on an operation signal supplied from the controller 30 (S101). Note here that a player character 48 that is a user's operation target among the player characters 48 belonging to the user team is referred to as a "user character".

Further, the control unit 14 updates the state (for example, the position, the movement direction, and so forth) of a teammate player character (S102). Note here that a player character 48 that is not a user's operation target among the player characters 48 belonging to the user team is referred to as a "teammate player character". For example, the control unit 14 updates the state of a teammate player character according to an AI.

When the user character is holding the ball 46, the control unit 14 executes processing, such as is shown in FIG. 11, at step S102. That is, when the user character is holding the ball 46, as shown in FIG. 11, the control unit 14 (the receiving position candidate setting unit 62) sets the receiving position candidates 70, based on the position of the user character (S201). That is, the control unit 14 sets a plurality of positions in an area around the position of the user character as the receiving position candidates 70 where a teammate player character receives a pass from the user character holding the ball 46. For example, the receiving position candidates 70A to 70G, such as are shown in FIGS. 6 and 7, are set.

After execution of the processing at step S201, the control unit 14 (the receiving position selecting unit 64) selects at least one of the receiving position candidates 70 set at step S201 (S202). For example, the receiving position candidates 70 set at step S201 are divided into a plurality of groups, and the receiving position selecting unit 64 selects one receiving position candidate 70 with respect to each group. For example, the receiving position candidates 70A to 70H are divided into three groups including one including the receiving position candidates 70A, 70E, 70H, one including the receiving position candidates 70C, 70D, and one including the receiving position candidates 70B, 70F, 70G. Then, one receiving position candidate 70 present in an open space is selected with respect to each group. Note that when there is no receiving position candidate 70 in a group present in an open space, no receiving position candidate 70 is selected for the group.

After execution of the processing at step S202, the control unit 14 (the character selecting unit 66) selects a teammate player character corresponding to each of the receiving position candidates 70 selected at step S202 (S203). For example, for each of the receiving position candidates 70 selected at step S202, the control unit 14 selects, as a teammate player character corresponding to the receiving position candidate 70, a teammate player character positioned closest to the receiving position candidate 70 from among the teammate player characters. Note that the control unit 14 does not select a teammate player character already selected as a teammate player character corresponding to any receiving position candidate as a teammate player character corresponding to another receiving position candidate. For example, a teammate player character selected as a teammate player character corresponding to the first receiving position candidate 70 and a teammate player character selected as a teammate player character corresponding to the second receiving position candidate 70 are not selected as a teammate player character corresponding to the third receiving position candidate 70.

Note that in a case in which the distance between a teammate player character closest to the receiving position candidate 70 and the receiving position candidate 70 is equal to or longer than a predetermined distance, the control unit 14 may select no teammate player character corresponding to the receiving position candidate 70. Further, in a case in which the distance between the base position of a teammate player character and the receiving position candidate 70 is equal to or longer than a predetermined distance also, the control unit 14 may not select the teammate player character as the teammate player character corresponding to the receiving position candidate 70. That is, although a user may feel uncomfortable when a teammate player character has moved to a farther receiving position candidate or a receiving position candidate farther from the base position, the above arrangement can prevent such inconvenience.

Note here that the order of the processing at step S202 and the processing at step S203 may be exchanged. That is, the processing at step S203 may be executed first, followed by the processing at step S202. In this case, in the processing at step S203, a teammate player character corresponding to each of the receiving position candidates 70 set at step S201 is selected.

After execution of the processing at steps S202 and S203, the control unit 14 (the character control unit 68) moves the teammate player character selected at step S203 as a teammate player character corresponding to the receiving position candidate 70 selected at step S202 toward the receiving position candidate 70 selected at step S202 (S204). Description on the processing shown in FIG. 11 is completed with the above. With the processing shown in FIG. 11 executed, the player character 48B moves to the receiving position candidate 70E in a situation such as is shown in FIG. 6, for example.

As shown in FIG. 10, after execution of the processing at step S102, the control unit 14 updates the state (for example, the position and the movement direction) of an opponent player character (S103). Note here that a player character 50 belonging to the opponent team is referred to as "an opponent player character". For example, the control unit 14 updates the state of an opponent player character according to an AI.

After execution of the processing at step S103, the control unit 14 updates the score data and the elapsed period data (S104). For example, the control unit 14 determines whether or not the ball 46 has moved into the goal 44, and updates the score data based on the determination result.

After execution of the processing at step S104, the control unit 14 updates the game screen (S105). For example, the control unit 14 generates in the VRAM a game screen showing the game space 40 viewed from the virtual camera 52. The game screen generated in the VRAM is displayed on the display unit 32. Description on the processing shown in FIG. 10 is completed with the above.

According to the above described game device 10, for example, a teammate player character is approaching an open space near the player character 48 holding the ball 46. As a result, according to the game device 10, it is possible to assist a user to readily make a pass to a teammate player character.

Further, a plurality of positions having a predetermined positional relationship with the position of the player character 48 holding the ball 46 are set as receiving position candidates 70 for receiving a pass from the player character 48. Then, a receiving position candidate 70 present in an open space is selected from among the receiving position candidates 70, and a teammate player character is moving toward the selected receiving position candidate 70. A method for finding an open space near the player character 48 holding the ball 46 is not limited to one for finding a position having a predetermined positional relationship with respect to the position of the player character 48 holding the ball 46, but also a method for freely finding an open space may be employed. With the latter method employed, however, two or more very close free spaces may be found. When a plurality of teammate player characters are caused to move toward these open spaces, the result is that a plurality of teammate player characters move to very close areas, so that teammate player characters become obstacles to one another. In this regard, the game device 10 can prevent such inconvenience.

Note that the present invention is not limited to the above-described embodiment.

[1] For example, the receiving position candidate setting unit 62 may set the receiving position candidate 70 in consideration of the movement direction (or a frontward direction) of the player character 48 holding the ball 46. For example, in the example shown in FIG. 7, the direction 72A may be set so as to coincide with the movement direction (or the frontward direction) of the player character 48 holding the ball 46. Note that in this case, the relative relationship between the directions 72B to 72G and the direction 72A is similar to that in the example shown in FIG. 7. That is, for example, the direction 72B is set opposite to the direction 72A. Thus, the direction 72B is set opposite to the movement direction (or the frontward direction) of the player character 48 holding the ball 46.

In this manner, the receiving position candidate 70 is set in consideration of the movement direction (or the frontward direction) of the player character 48 holding the ball 46. Consequently, another player character 48 (a teammate player character) comes closer to receive a pass in consideration of the movement direction (or the frontward direction) of the player character 48 holding the ball 46.

[2] For example, the receiving position candidate setting unit 62 may use the position of the ball 46, instead of the position of the player character 48 holding the ball 46.

For example, while the user character is dribbling, the user may pay more attention to the position of the ball 56 rather than the position of the user character. In this regard, in a case where the receiving position candidate is set based on the position of the user character, it may result in a user not being able to readily recognize the receiving position candidate when, for example, the user character is dribbling at distance (that is, when the user character is dribbling with a relatively large distance between the user character and the ball 56) or the like, and it may result in the user not being able to readily recognize a teammate player character approaching a position based on the receiving position candidate (that is, a teammate player character coming closer to receive a pass). In this regard, with the above, it is possible to avoid a situation in which a user can hardly recognize a teammate player character approaching to receive a pass, even when the user pays more attention to the position of the ball 56 rather than the position of the user character while playing the game.

[3] For example, a user may be allowed to designate the distance between the position of the player character 48 holding the ball 46 and the receiving position candidate 70. That is, a parameter concerning the distance between the position of the player character 48 holding the ball 46 and the receiving position candidate 70 may be stored in the game data storage unit 60, and the receiving position candidate setting unit 62 may set the distance between the position of the player character 48 holding the ball 46 and the receiving position candidate 70, based on the above-described parameter. Then, the user may be allowed to change the value of the above described parameter, for example, on an option screen (a setting screen) or the like. That is, the value of the above described parameter may be changed based on a change operation by the user.

[4] For example, when a player character 48 selected by the character selecting unit 66 as a teammate player character corresponding to the receiving position candidate 70 selected by the receiving position selecting unit 64 moves to a position based on the receiving position candidate 70 selected by the receiving position selecting unit 64, the player character 48 may be presented to the user on the game screen. For example, by distinctly showing the player character 48 moving to the position based on the receiving position candidate 70, the player character 48 may be presented to a user. Specifically, the player character 48 moving to the position based on the receiving position candidate 70 may be shown in a different manner. That is, for example, the color of the player character 48 moving to the position based on the receiving position candidate 70 may be changed or an effect may be applied to the player character 48 so that the player character 48 appears to stand out. Alternatively, a predetermined image (sign) may be displayed near the player character 48 (that is, a position determined based on the position of the player character 48). With the above, a user can recognize the player character 48 coming to receive a pass, which makes it easier for the user to make a pass to another player character 48.

[5] For example, the game space may be a virtual 2D space with two coordinate axes set thereto. That is, the game space may be a virtual 2D space where the positions of a player character and the ball are managed using two coordinate elements.

[6] For example, the present invention is applicable to a sport game other than a soccer game (for example, a basketball game, an ice hockey game, a baseball game, or the like). Further, the present invention is applicable to a game other than a sport game.

The invention claimed is:

1. A game device which causes a display screen to show a match using a moving object performed between a user character group and an opponent character group, the game device comprising:
    at least one input device;
    at least one processor; and
    at least one memory device that stores a plurality of instructions, which when executed by the at least one processor, causes the at least one processor to operate with the at least one input device to:
        set state data of a virtual camera based on a position of the moving object such that the moving object is visible through the virtual camera, wherein the state data of the virtual camera is stored in the at least one memory device and the state data comprises a position, viewing direction, and moving speed of the virtual camera;
        obtain position data which is stored in the at least one memory device, wherein said memory device stores position data on a position of each of a plurality of characters belonging to the user character group and a position of each of a plurality of characters belonging to the opponent character group;
        determine, when any of the characters belonging to the user character group holds the moving object, a plurality of positions in an area around the character holding the moving object as potential receiving positions corresponding to another character belonging to the user character group, the potential receiving positions being set before a pass is performed by the character holding the moving object, wherein
        (i) the plurality of positions are set around a perimeter of a geometric shape and the character holding the moving object is positioned in the center of the geometric shape,
        (ii) the plurality of positions are set on respective straight lines extending from the position of the character holding the moving object in a plurality of predetermined directions,
        (iii) at least two of the plurality of positions are set in opposite directions around the perimeter of the geometric shape from each other, and
        (iv) a relative positional relationship between the character holding the moving object and the plurality of positions is maintained in accordance with the movement of the character holding the moving object;
        decide at least one of the potential receiving positions, based on a position of at least one character belonging to the opponent character group;
        choose a character corresponding to at least one of the potential receiving positions from among the characters belonging to the user character group other than the character holding the moving object, based on at least one of the potential receiving positions and positions of the characters belonging to the user character group other than the character holding the moving object;
        move the selected character toward a position based on the selected potential receiving position before the pass is performed by the character holding the moving object; and
        cause the display screen to show the match based on the state data of the virtual camera.

2. The game device according to claim 1, wherein, in a case where the character holding the moving object moves, the at least one processor is further configured to set, as the potential receiving positions, a plurality of positions in an area around a position of the character holding the moving object after the movement, to thereby cause the potential receiving positions to move according to the movement of the character holding the moving object.

3. The game device according to claim 1, wherein the at least one processor is further configured to set as the potential receiving positions the plurality of positions in the area around the character holding the moving object, the plurality of positions having a predetermined relative positional relationship with the position of the character holding the moving object.

4. The game device according to claim 1, wherein
    the plurality of positions in the area around the character holding the moving object are set so as to surround the position of the character holding the moving object, and
    the at least one processor is further configured to set the plurality of positions surrounding the position of the character holding the moving object as the potential receiving positions.

5. The game device according to claim 1, wherein the plurality of predetermined directions include a first direction, a second direction opposite to the first direction, a third direction orthogonal to the first direction, a fourth direction opposite to the third direction, a fifth direction between the first direction and the third direction, a sixth direction between the second direction and the third direction, a seventh direction between the first direction and the fourth direction, and an eighth direction between the second direction and the fourth direction.

6. The game device according to claim 1, wherein the at least one processor is further configured to present to the user the character moving toward the position based on the selected at least one potential receiving position in a game screen.

7. The game device according to claim 1, wherein a distance between a position of the character holding the moving object and each of the potential receiving positions is set based on an operation by a user.

8. A control method for controlling a game device which causes a display screen to show a match using a moving object performed between a user character group and an opponent character group, the game device comprising at least one specially configured microprocessor and at least one memory device, the control method comprising:
    setting, by at least the one specially configured microprocessor, state data of a virtual camera based on a position of the moving object such that the moving object is visible through the virtual camera, wherein the state data of the virtual camera is stored in the at least one memory device and the state data comprises a position, viewing direction, and moving speed of the virtual camera;
    obtaining, by at least the one specially configured microprocessor, position data stored in the at least one memory device that stores position data on a position of each of a plurality of characters belonging to the user character group and a position of each of a plurality of characters belonging to the opponent character group;

determining, by at least the one specially configured microprocessor, when any of the characters belonging to the user character group holds the moving object, a plurality of positions in an area around a position of the character holding the moving object as potential receiving positions corresponding to another character belonging to the user character group, the potential receiving positions being set before a pass is performed by the character holding the moving object, wherein
(i) the plurality of positions are set around a perimeter of a geometric shape and the character holding the moving object is positioned in the center of the geometric shape,
(ii) the plurality of positions are set on respective straight lines extending from the position of the character holding the moving object in a plurality of predetermined directions,
(iii) at least two of the plurality of positions are set in opposite directions around the perimeter of the geometric shape from each other, and
(iv) a relative positional relationship between the character holding the moving object and the plurality of positions is maintained in accordance with the movement of the character holding the moving object;
deciding, by at least the one specially configured microprocessor, at least one of the potential receiving positions, based on a position of at least one character belonging to the opponent character group;
choosing, by at least the one specially configured microprocessor, a character corresponding to at least one of the potential receiving positions from among the characters belonging to the user character group other than the character holding the moving object, based on at least one of the potential receiving positions and positions of the characters belonging to the user character group other than the character holding the moving object;
moving, by at least the one specially configured microprocessor, the selected character toward a position based on the selected potential receiving position before the pass is performed by the character holding the moving object; and
causing, by at least the one specially configured microprocessor, the display screen to show the match based on the state data of the virtual camera.

9. A non-transitory computer readable information storage medium storing a program for causing a computer, comprising at least one processor, to function as a game device which causes a display screen to show a match using a moving object performed between a user character group and an opponent character group, the program further causing the at least one processor in the computer to:
update state data of a virtual camera based on a position of the moving object such that the moving object is visible through the virtual camera, wherein the state data of the virtual camera is stored in the non-transitory computer readable information storage medium and the state data comprises a position, viewing direction, and moving speed of the virtual camera;
obtain position data stored in the non-transitory computer readable information storage medium that stores position data on a position of each of a plurality of characters belonging to the user character group and a position of each of a plurality of characters belonging to the opponent character group;
determine, when any of the characters belonging to the user character group holds the moving object, a plurality of positions in an area around a position of the character holding the moving object as potential receiving positions corresponding to another character belonging to the user character group, the potential receiving positions being set before a pass is performed by the character holding the moving object, wherein
(i) the plurality of positions are set around a perimeter of a geometric shape and the character holding the moving object is positioned in the center of the geometric shape,
(ii) the plurality of positions are set on respective straight lines extending from the position of the character holding the moving object in a plurality of predetermined directions,
(iii) at least two of the plurality of positions are set in opposite directions around the perimeter of the geometric shape from each other, and
(iv) a relative positional relationship between the character holding the moving object and the plurality of positions is maintained in accordance with the movement of the character holding the moving object;
decide at least one of the potential receiving positions, based on a position of at least one character belonging to the opponent character group;
choose a character corresponding to at least one of the potential receiving positions from among the characters belonging to the user character group other than the character holding the moving object, based on at least one of the potential receiving positions and positions of the characters belonging to the user character group other than the character holding the moving object;
move the selected character toward a position based on the selected potential receiving position before the pass is performed by the character holding the moving object; and
cause, by at least the one specially configured microprocessor, the display screen to show the match based on the state data of the virtual camera.

10. A game device which causes a display screen to show a match using a moving object performed between a user character group and an opponent character group, the game device comprising at least one specially configured microprocessor and at least one memory device that stores a plurality of instructions, which when executed by the at least one specially configured microprocessor, causes the at least one specially configured microprocessor to:
obtain position data stored in the at least one memory device that stores position data on a position of each of a plurality of characters belonging to the user character group and a position of each of a plurality of characters belonging to the opponent character group;
determine, when any of the characters belonging to the user character group holds the moving object, a plurality of positions in an area around the character holding the moving object as potential receiving positions corresponding to another character belonging to the user character group, the potential receiving positions being set before a pass is performed by the character holding the moving object, wherein
(i) the plurality of positions are set around a perimeter of a geometric shape and the character holding the moving object is positioned in the center of the geometric shape,
(ii) the plurality of positions are set on respective straight lines extending from the position of the character holding the moving object in a plurality of predetermined directions,
(iii) at least two of the plurality of positions are set in opposite directions around the perimeter of the geometric shape from each other, and (iv) a relative positional relationship between the character holding the moving object and the plurality of positions is maintained in accordance with the movement of the character holding the moving object;

decide at least one of the potential receiving positions, based on a position of at least one character belonging to the opponent character group;

choose a character corresponding to at least one of the potential receiving positions from among the characters belonging to the user character group other than the character holding the moving object, based on at least one of the potential receiving positions and positions of the characters belonging to the user character group other than the character holding the moving object; and move the selected character toward a position based on the selected potential receiving position before the pass is performed by the character holding the moving object.

\* \* \* \* \*